GASOLINE VENDING APPARATUS

Original Filed Dec. 4, 1958 2 Sheets-Sheet 1

INVENTOR.
BENNETT L. HARRIS
BY Kenyon & Kenyon
ATTORNEYS

GASOLINE VENDING APPARATUS

Original Filed Dec. 4, 1958 2 Sheets-Sheet 2

INVENTOR.
Bennett C. Harris
BY Kenyon & Kenyon
Attorneys

United States Patent Office

Re. 25,254
Reissued Oct. 9, 1962

25,254
GASOLINE VENDING APPARATUS

Bennett L. Harris, 4 Stonewall Lane, Mamaroneck, N.Y.

Original No. 2,977,024, dated Mar. 28, 1961, Ser. No. 778,108, Dec. 4, 1958. Application for reissue June 2, 1961, Ser. No. 115,860
8 Claims. (Cl. 222—2)

Matter enclosed in heavy brackets [ ] appears in the original patent but forms no part of this reissue specification; matter printed in italics indicates the additions made by reissue.

This invention relates to a gasoline vending apparatus and more particularly, to a device which will permit the automatic dispensing of gasoline on either a self-service basis or on an attendant controlled basis.

An object of this invention resides in the provision of a self-service gasoline vending apparatus wherein a purchaser can obtain a supply of gasoline for his vehicle or for other purposes through the use of a novel credit card.

A further object of the invention resides in the provision of means for preventing theft of proceeds from the sale of gasoline by an attendant or falsification of the amount of sale.

Another object of the present invention resides in the provision of a credit card which is provided with means for identifying the purchaser, and which is also provided with a photographic strip for actuating a check switch in the vending apparatus whereby only authorized purchasers having a credit card in their possession can utilize the vending apparatus for self-service dispensing of gasoline and wherein no time-consuming write-up of a sale is made by an attendant, who may be available for additional services to a gasoline purchaser.

Still further objects and features of the invention reside in the provision of a vending apparatus for gasoline and similar products that is simple in operation, inexpensive to install on already existing gasoline pumps, yet which is substantially foolproof in operation and will result in great savings to a gasoline station operator while assuring against thefts and other fraudulent practices.

These together with the various ancillary objects which will become apparent as the following description proceeds are attained by this vending apparatus, a preferred embodiment being shown in the accompanying drawing by way of example only wherein.

Figure 1:
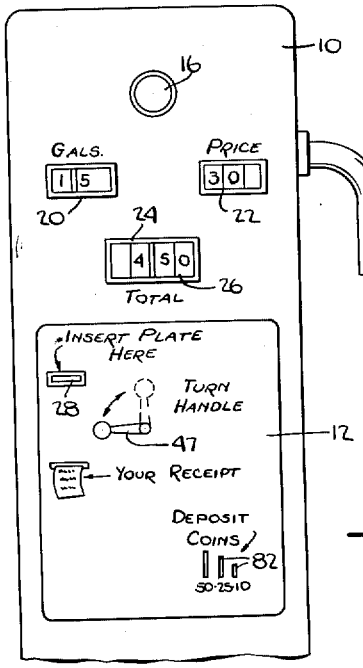
FIG. 1 is an elevational view of a portion of a gasoline pump having the invention installed thereon.
Figure 2:
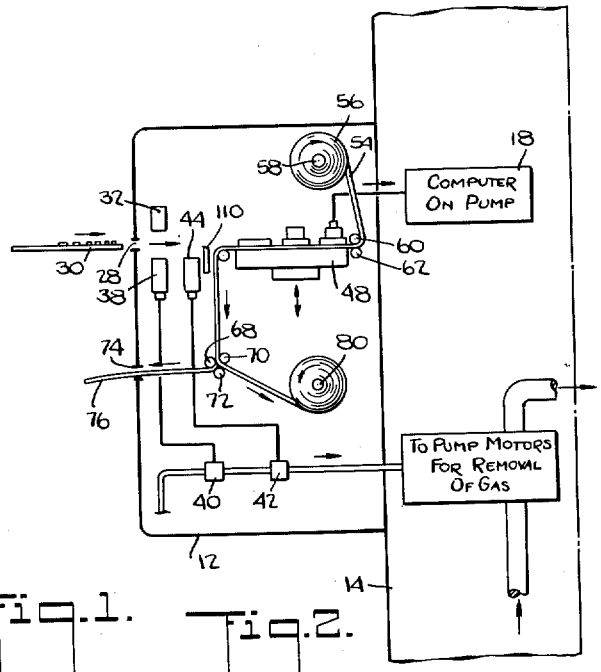
FIG. 2 is a diagrammatic side view of the invention in association with a gasoline pump with the parts thereof being shown schematically for clarity.
Figure 3:
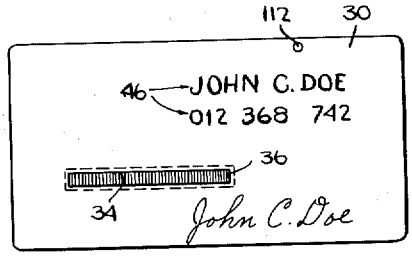
FIG. 3 is a plan view of a credit card adapted to be utilized in conjunction with the vending apparatus and forming part of the present invention.

With continuing reference to the accompanying drawing wherein like reference numerals designate similar parts throughout the various views, reference numeral 10 generally designates a gasoline pump which may otherwise be of conventional construction but which is adapted to receive the housing 12 within the pump housing 14.

The pump may be provided with a conventional signal device 16 for indicating flow of fluid, and may be provided with a conventional computer 18 for providing an indication of the number of gallons as at 20 which are delivered by the pump.

Further, means for setting into the computer the price of the gasoline per gallon, which is of conventional construction may form a part of the computer, and indicia for indicating the price is provided on the pump as at 22, together with a view plate 24 through which the total cost of a sale as at 26 may be provided.

In accordance with the concepts of the present invention, in lieu of the usual key that the attendant is provided with for unlocking a pump, there is provided a check switch capable of activating the pump which is operated upon insertion of a credit card in an opening 28 formed in the housing 12.

When the credit card 30 passes into the opening 20, light from a light source 32 will pass through or impinge on a photographic strip 34 fixed in a slot 36 in the credit card 30.

The light passing through the photographic strip 34 will pass onto a series of photo-electric cells 38. The photo-electric cells 38 are each keyed to a characteristic amount of light and will only activate the solenoid 40 when the photographic strip 34 is of particular characteristics. The photographic strip 34 is provided with areas of different opacities, that is, some areas may be entirely opaque, some may be completely transparent, and some may be translucent or partially opaque.

The solenoid, when actuated, functions as a check switch in conjunction with solenoid 42, which is connected to micro switches 44 adapted to be depressed and actuated by raised lettering or type 46 provided in a characteristic location on the credit card 30.

A further switch or handle 47 is provided for control of the pump for delivering gasoline from the pump to a vehicle or other container. Hence, when both the solenoids 40 and 42 are actuated and the pump [46] *10* is set in operation through the operation of switch means *91* controlled by the handle 47, fluid will flow from the pump.

The pump is provided with a conventional computer 18 which actuates a printer 48. The handle 47 controls printer 48 and has an "up" position and a "down" position. In the "up" position the printer is lowered and gasoline is allowed to be pumped. In the "down" position the printer is raised. Therefore printing and the gasoline is shut off while pin 110 is lowered. Further, the lowermost position of the handle operates a feed ratchet (not shown) of conventional construction to feed the receipt outwardly. The printer 48 has a dater and identification station 50, as well as cost printing station 52 operated by the computer 18 for impressing on a strip blank invoices in triplicate as at 54 issuing from a roll 56 mounted on a pin 58 or other suitable means within the housing 12. The blank invoices are preferably interleafed with carbons.

Guides 60 and 62 are provided for ensuring that the blank invoices pass to the printing stations. A pressure plate as at 64 is also provided as a printing station for impressing data from the card 30 onto the invoices.

Figure 5:
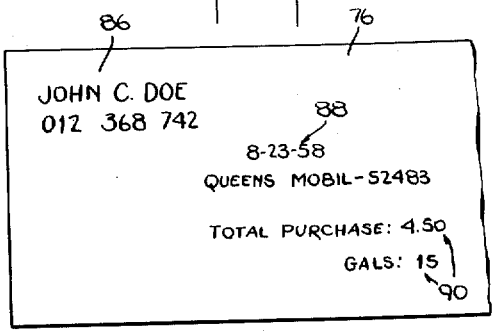
FIG. 5 is a partial plan view of a receipt issued by the apparatus.
Figure 4:
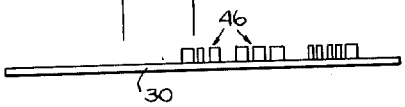
FIG. 4 is an elevational view of the credit card.
Figure 6:
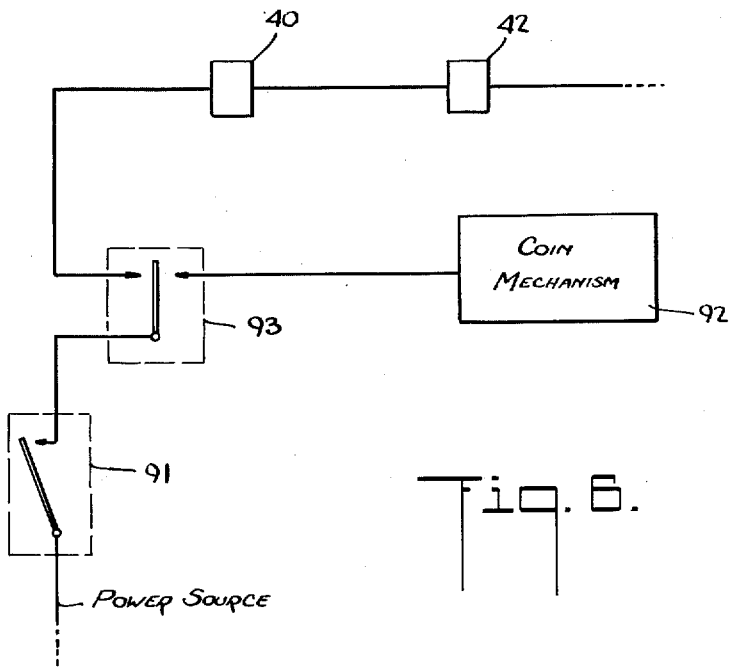
*FIG. 6 is a diagrammatical illustration of the by-pass switch and coin controlled mechanism.*

A further guide 66 is provided about which the printed invoices are entrained and then these triplicate invoices are led to a series of guides 68, 70 and 72 where they are separated with one of the printed invoices passing out of the opening 74 to serve as a receipt 76 (see FIG. 5), the end of the invoice being turned or otherwise cut at delivery. The other two invoices are then wrapped about roll 78 mounted on a pin or shaft 80.

As can be readily seen from an inspection of FIG. 1, in lieu of the check switch provided by the solenoids 40 and 42, slots as at 82 may be provided in the housing 12 for actuating a coin-controlled mechanism *92* which by-passes the other *solenoids* [switches] 40 and 42 *by means of by-pass switch 93*, and directly connects the computer and the pump motors with the switch *means 91 controlled by handle 47* [46] to operate the pump motors to deliver gasoline corresponding to a particular amount deposit in the slots 82. Of course, the coin controlled mechanism is of a conventional construction.

In use, each attendant will be given a card corresponding to the credit card 30 so that the attendant's name or other indicia will be imprinted on the invoices, thus serving to provide a check on the amount of sales made by a particular attendant.

In operation for a cash customer, the attendant will deposit his own card in the slot 28 and deliver gas to the customer. He will then obtain from the customer cash corresponding to the amount on the receipt which is delivered to the attendant and will then turn this amount over to the station operator with the invoices on the roll 78 providing a double check against any forgetfulness or fraudulent practice on the part of an attendant.

The credit customer will give his card to the attendant and the invoice on the roll 78 will provide the station operator means for billing the main office of the gasoline company and provide means for informing the main office of the particular purchase by the particular customer who has the credit card.

Of course, self-service operation can be had at night or other times when the gasoline station is not attended since the credit customer will then insert his own credit card in the slot 28 in lieu of having the card inserted by the attendant.

The micro-switch 44 provides means of ensuring that at least some indicia remain on the card 30 so as to prevent the type 46 from being filed off. The photographic strip 32 provides particular characteristic control so that it will be extremely difficult for a forgery of the credit card to be undertaken.

The invoice 76 will, of course, have indicia 86 thereon corresponding to the type 46, the date as at 88 of purchase provided by the dating station 50, and the total amount of purchase provided by indicia 90 applied by the station 52. The plate 64 is, of course, provided for impressing the type 46 onto the invoices.

A locking mechanism 110, in the form of a pin is provided to hold the card 30 in position during operation and delivery of gasoline against withdrawal of the card 30. The pin 110 extends through an aperture 112 in the card 30.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A gasoline vending apparatus comprising an electrically operated pump, switch means for actuating said pump, a housing having an opening therein, said switch means including a handle extending outwardly of said housing, a *credit card* [check] having a graduated film strip therein, a check switch in said housing further controlling said pump, a source of illumination in said housing, a photoelectric cell connected to said check switch in close proximity to said opening so that light passing from said source and through said film strip of said [check] *credit card* introduced through said opening will impinge on said photo-electric cell to actuate said check switch, computer means on said pump for metering gasoline delivered by said pump and calculating the cost thereof, a printer in said housing connected to and driven by said computer means to print the cost on an invoice and on a receipt, and means for retaining said invoice and delivering said receipt through said housing, said [check] *credit card* having raised printing type thereon, said printing type being employed by said printer to print indicia corresponding to said printing type on said receipt and said invoice, a micro-switch in said housing and adjacent said opening, said micro-switch being actuated by physical contact with raised type on said *credit card* [check].

2. A gasoline vending apparatus comprising an electrically operated pump, switch means for actuating said pump, a housing having an opening therein, said switch means including a handle extending outwardly of said housing, a *credit card* [check] having a graduated film strip therein, a check switch in said housing further controlling said pump, a source of illumination in said housing, a photo-electric cell connected to said check switch in close proximity to said opening so that light passing from said source and through said film strip of said [check] *credit card* introduced through said opening will impinge on said photo-electric cell to actuate said check switch, computer means on said pump for metering gasoline delivered by said pump and calculating the cost thereof, a printer in said housing connected to and driven by said computer means to print the cost on an invoice and on a receipt, and means for retaining said invoice and delivering said receipt through said housing, said *credit card* [check] having raised printing type thereon, said printing type being employed by said printer to print indicia corresponding to said printing type on said receipt and said invoice, a micro-switch in said housing *connected to said check switch and being located* adjacent said opening, said micro-switch being actuated by physical contact with said raised type on said *credit card, said actuated micro-switch in turn actuating said check switch,* [check] said film strip having a plurality of areas with some of said areas being of greater opacity than other of said areas, a by-pass switch between said switch means and said check switch, said housing having slots for coins therein, and a coin-controlled mechanism in said housing for receiving coins from said slots, said coin-controlled mechanism being connected to said pump and said by-pass switch to activate said pump in accordance with coins deposited in said slots.

*3. An automatic gasoline vending apparatus suitable for use with a credit card having two sets of coded indicia, one set of said indicia being in the form of raised lettering on one face of the card and the other in the form of a strip having discrete areas of relatively varying opacities set into a slotted opening of said card, comprising a housing having an opening therein for the insertion of said credit card, a pump for pumping gasoline, said pump being responsive to a control system comprising a first control means, a second control means and a third control means, said pump being energized only when said three control means are actuated, a source of illumination located in said housing and adapted to cause light to impinge on the said strip, said first control means being located in said housing and responsive to the pattern of light transmitted through said strip, said second control means being located in said housing and responsive to the presence of said raised lettering on said card, and said third control means being responsive to manual operation.*

*4. An automatic gasoline vending apparatus suitable for use with a credit card having two sets of coded indicia, one set of said indicia being in the form of raised lettering on one face of the card and the other in the form of a strip having discrete areas of relatively varying opacities set into a slotted opening of said card, comprising a housing having an opening therein for the insertion of said credit card, a pump for pumping gasoline, said pump being responsive to a control system comprising a first control means, a second control means, a third control means, and a by-pass control means, said pump being energized when said three control means are actuated, said by-pass control means being adapted to energize said pump in lieu of said second and third control means, a source of illumination located in said housing and adapted to cause light to impinge on the said strip, said first control means being located in said housing and responsive to the pattern of light transmitted through said strip, said second control means being located in said housing and responsive to the presence of said raised lettering on said card, and said third control means being responsive to manual op-*

*eration, said housing having slots for coins, and a coin-controlled mechanism located in said housing for receiving coins from said slots, said coin-controlled mechanism being connected to said pump and said by-pass control to activate in said pump in accordance with the coins deposited in said slots.*

*5. An automatic gasoline vending apparatus suitable for use with a credit card having two sets of coded indicia, one set of said indicia being in the form of raised lettering on one face of the card and the other in the form of a strip having discrete areas of relatively varying opacities set into a slotted opening of said card, said card also being provided with an aperture therein, comprising a housing having an opening therein for the insertion of said credit card, a pump for pumping gasoline, said pump being responsive to a control system comprising a first control means, a second control means and a third control means, said pump being energized only when said three control means are actuated, a source of illumination located in said housing and adapted to cause light to impinge on the said strip, said first control means being located in said housing and responsive to the pattern of light transmitted through said strip, said second control means being located in said housing and responsive to the presence of said raised lettering on said card, said third control means being responsive to manual operation, and locking means responsive to said manual operation comprising a pin adapted to engage the aperture of said card thereby locking said card in place during pumping of gasoline.*

*6. An automatic gasoline vending apparatus suitable for use with a credit card having two sets of coded indicia, one set of said indicia being in the form of raised lettering on one face of the card and the other in the form of a strip having discrete areas of relatively varying opacities set into a slotted opening of said card, comprising a housing having an opening therein for the insertion of said credit card, a pump for pumping gasoline, said pump being responsive to a control system comprising a first control means, a second control means and a third control means, said pump being energized only when said three control means are actuated, a source of illumination located in said housing and adapted to cause light to impinge on the said strip, said first control means comprising a series of photoelectric cells which are located in said housing, said series of photoelectric cells being selectively responsive to the pattern of light transmitted through said strip, said second control means being located in said housing and responsive to the presence of said raised lettering on said card, and said third control means being responsive to manual operation.*

*7. An automatic gasoline vending apparatus suitable for use with a credit card having two sets of coded indicia, one set of said indicia being in the form of raised lettering on one face of the card and the other in the form of a strip having discrete areas of relatively varying opacities set into a slotted opening of said card, comprising a housing having an opening therein for the insertion of said credit card, a pump for pumping gasoline, said pump being responsive to a control system comprising a first control means, a second control means and a third control means, said pump being energized only when said three control means are actuated, a source of illumination located in said housing and adapted to cause light to impinge on the said strip, said first control means comprising a series of photoelectric cells which are located in said housing, said series of photoelectric cells being selectively responsive to the pattern of light transmitted through said strip, said second control means comprising at least one micro-switch being located in said housing, said micro-switch being actuated by the presence of said raised lettering on said card, and said third control means being responsive to manual operation.*

*8. An automatic gasoline vending apparatus suitable for use with a credit card having two sets of coded indicia, one set of said indicia being in the form of raised lettering on one face of the card and the other in the form of a strip having discrete areas of relatively varying opacities set into a slotted opening of said card, comprising a housing having an opening therein for the insertion of said credit card, a pump for pumping gasoline, said pump being responsive to a control system comprising a first control means, a second control means and a third control means, said pump being energized only when said three control means are actuated, a source of illumination located in said housing and adapted to cause light to impinge on the said strip, said first control means comprising a series of photoelectric cells which are located in said housing, said series of photoelectric cells being selectively responsive to the pattern of light transmitted through said strip, said second control means comprising at least one micro-switch being located in said housing, said micro-switch being actuated by the presence of said raised lettering on said card, and said third control means being actuated by a manually operated handle located outside of said housing.*

References Cited in the file of this patent or the original patent

| | | |
|---|---|---|
| 2,564,015 | Lillig | Aug. 14, 1951 |
| 2,585,821 | Mueller | Feb. 12, 1952 |
| 2,612,428 | Vroom | Sept. 30, 1952 |
| 2,792,148 | Goldenberg | May 14, 1957 |